US009815949B2

(12) United States Patent
Oromiehie et al.

(10) Patent No.: US 9,815,949 B2
(45) Date of Patent: Nov. 14, 2017

(54) BIODEGRADABLE NANOCOMPOSITES CONTAINING NANOCLAY AND TITANIUM DIOXIDE NANOPARTICLES

(71) Applicants: Abdul Rasoul Oromiehie, Tehran (IR); Pegah Gusheh, Tehran (IR)

(72) Inventors: Abdul Rasoul Oromiehie, Tehran (IR); Pegah Gusheh, Tehran (IR)

( * ) Notice: Subject to any disclaimer, the term of this patent is extended or adjusted under 35 U.S.C. 154(b) by 138 days.

(21) Appl. No.: 13/955,006

(22) Filed: Jul. 31, 2013

(65) Prior Publication Data

US 2015/0038611 A1 Feb. 5, 2015

(51) Int. Cl.
*C08J 3/20* (2006.01)
*C08K 3/00* (2006.01)
*C08K 3/34* (2006.01)
*C08K 5/00* (2006.01)
*C08K 3/22* (2006.01)

(52) U.S. Cl.
CPC .............. *C08J 3/203* (2013.01); *C08K 3/0033* (2013.01); *C08J 2300/16* (2013.01); *C08J 2303/02* (2013.01); *C08J 2323/06* (2013.01); *C08J 2403/02* (2013.01); *C08J 2423/06* (2013.01); *C08K 3/005* (2013.01); *C08K 3/346* (2013.01); *C08K 5/0016* (2013.01); *C08K 2003/2241* (2013.01); *C08K 2201/011* (2013.01); *C08K 2201/018* (2013.01)

(58) Field of Classification Search
None
See application file for complete search history.

(56) References Cited

U.S. PATENT DOCUMENTS

| 3,850,862 | A | * | 11/1974 | Clendinning et al. | 23/128 |
|---|---|---|---|---|---|
| 3,949,145 | A | * | 4/1976 | Otey et al. | 428/424.6 |
| 4,133,784 | A | * | 1/1979 | Otey et al. | 523/128 |
| 4,337,181 | A | * | 6/1982 | Otey et al. | 523/128 |
| 5,162,392 | A | * | 11/1992 | Wool et al. | 523/128 |
| 5,461,094 | A | * | 10/1995 | Yoo et al. | 524/47 |
| 6,071,580 | A | * | 6/2000 | Bland et al. | 428/36.5 |
| 6,228,501 | B1 | * | 5/2001 | Nakazawa et al. | 428/454 |
| 6,811,599 | B2 | * | 11/2004 | Fischer et al. | 106/287.17 |

(Continued)

FOREIGN PATENT DOCUMENTS

WO     WO 90/14388 A1    11/1990

*Primary Examiner* — Peter A Salamon
(74) *Attorney, Agent, or Firm* — Azadeh Saidi

(57) ABSTRACT

In the present invention, biodegradable nanocomposites are introduced which include nanoclay particles, titanium dioxide nanoparticles, polyethylene, polypropylene, starch as a biopolymer, maleic anhydride and glycerol. The obtained nanocomposites have very high physical, mechanical and antimicrobial properties. Proper dispersion and distribution of nanoparticles in composite substrate would help in improving the quality of the product to a great extent. The presence of polypropylene next to polyethylene would eliminate the weak points of polyethylene/biopolymer composite as polypropylene helps to modify the physical and engineering properties of nanocomposites in the presence of nanoclay. Titanium dioxide nanoparticles have antimicrobial properties and would result in products which are useful for food and pharmaceutical industries. Another important aspect of this invention is the production of samples in one step by reaction extrusion method.

17 Claims, 7 Drawing Sheets

(56) References Cited

U.S. PATENT DOCUMENTS

| | | | |
|---|---|---|---|
| 2006/0246272 A1* | 11/2006 | Zhang et al. | 428/304.4 |
| 2007/0049888 A1* | 3/2007 | Soerens et al. | 604/372 |
| 2011/0189250 A1* | 8/2011 | John et al. | 424/405 |
| 2014/0102991 A1* | 4/2014 | Kharlampieva et al. | 210/748.14 |

* cited by examiner

BIODEGRADABLE NANOCOMPOSITES CONTAINING NANOCLAY AND TITANIUM DIOXIDE NANOPARTICLES

BACKGROUND OF THE INVENTION

With growing severe environmental pollutions in relation to plastics wastes urgent strategies are needed. One of the suitable strategies would be to take advantage of biodegradable plastics. There have been intensive studies on biodegradable plastics in the last several decades and various products have been invented and commercialized as waste bags etc.

Biodegradable films are produced by adopting polyolefines in the presence of a biopolymer such as starch which can reduce the petroleum-based polymers consumption in the production of biodegradable composites. Starch is cheap and easily accessible and it is one of the renewable sources which can be assimilated and metabolized by great number of microorganisms (bacteria, fungi and algae . . . ). Polyethylene is one of the world's main and cheapest plastic materials. Polyethylene is obtained from ethylene and it has high chemical resistance, suitable transparency as thin films and odor free and non-irritating with low water permeability in packaging industry.

U.S. Pat. No. 6,811,599 B2; describes biodegradable thermoplastics, produced by extrusion. The product includes natural polymer, plasticizer and nanoclay particles. Nanoclay particles are used as filler which play important role in improving the mechanical properties of the product. In this invention biodegradable substances are used with different degrees of substitutions, but giving low tensile strength and low permeability to water. The system is not suitable for packaging due to its solubility in water.

U.S. Pat. No. 6,228,501 B1; describes production of composites comprised of polysaccharides and clay which are used as thermal insulator or sound absorbing materials. With addition of nanoclays the impact and tensile properties of the systems are improved compared to other commercial forms. The mechanical properties of these materials are not considered suitable for packaging industry.

U.S. Pat. No. 5,461,094 A; describes the basic composite comprised of polyethylene and starch with the help of maleic anhydride as coupling agent.

WO 9,014,388 A1; describes the production of nanocomposites comprised of nanoclay and natural polymer such as corn starch with variable contents of 5 to 50%. The polymer is of synthetic type of light polyethylene and the compatibilizer is maleic anhydride

SUMMARY OF THE INVENTION

Figure 1:
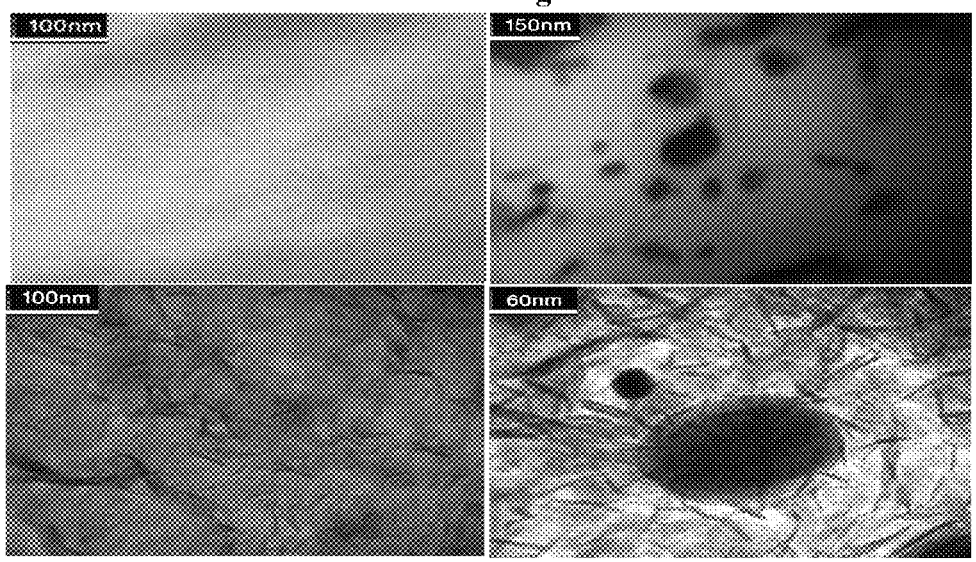
FIG. 1, displays TEM photos of a nanocomposite in presence of nanoparticles.

As mentioned above, all the inventions include a biopolymer such as starch in their formulations. However in the present invention attempts are made to improve the mechanical properties, such as modulus and tensile properties, which are not considered so high in the above patents. Therefore, to meet specific demands such as impermeability towards water, gases and damp as well as possessing strong anti-microbial properties to be used in food and pharmaceutical industries, our system of invention includes polypropylene and nanoclay particles next to polyethylene which have shown to be highly effective in meeting the above demands.

The important aspect of this invention is taking less steps in producing the product, using a pilot plant production method and increasing the mechanical properties such as impact resistance and tensile strength under the condition of high percentage of a biopolymer.

The use of nanoclay is to modify the properties of polypropylene by improving the impact and tensile strengths of the final product under the condition of high percentage of starch, as biopolymer, and finally imparting anti-microbial property by addition of titanium dioxide nanoparticles to make the product suitable for food and pharmaceutical packaging.

In this invention no solvent is used to prepare raw materials and by weight percentage nanoclay particles is at least 3% while titanium dioxide nanoparticles is at least 2%.

Glycerol was plasticizer of choice which was used ⅓ relative to biopolymer, and for more effective intercalation nanoclays were mixed with glycerol before mixing with biopolymer.

A biopolymer can be selected among many types of polysaccharides such as carboxymethyl cellulose, chitosan, keratin or starch which itself can be of various types extracted from peas, soya, potatoes, corn and wheat.

A compatibilizer would create the favorable condition of using nanoparticles in melt state as the most efficient methods to produce nanocomposites. In this method there is no need for solvent or adopting any specific process and therefore, its forming process is compatible environmentally and eco-friendly with consumer demand with no disadvantages.

Maleic anhydride is one of the compatibilizers, which mixes well with nanoclay and polypropylene. This compatibilizer is needed for inclusion of a polar group onto hydrophobic chain which is facilitated by extrusion process. To graft maleic anhydride onto polypropylene is to link two components in such a way that the hydrocarbon end of the compatibilizer forms bond with the polypropylene matrix whereas its oxygen atom is able to form strong hydrogen bond, by electrostatic attraction, with the hydroxide groups of nanoclay particles which is predicted to help in intercalation process.

In this invention compatibilizer of our choice was maleic anhydride. Titanium dioxide nanosize particles were of anatase type with at least 30% and rutile of at least 70%.

Also Polypropylene has specific properties such as low density, high thermal stability and suitable resistance towards corrosion and it is widely used in many applications. In the presence of nanoclay particles in composite matrix most physical and engineering properties of polypropylene improve drastically. Nanoclay particles as suitable filler, display high performance, and at the end is to gain products of desirable hardness.

Nanoclay Particles increase tensile strength and modulus, dynamic hardness, flame-retardancy improvement, low permeability towards water, carbon dioxide and oxygen. $TiO_2$ as a metal oxide has main crystal phases of "anatase" and "rutile". The energy gap of this material is ⅔ electron volt which can absorb ultra-violet absorption.

Nanoclay also has photocatalytic and self-cleaning properties. Due to its hydrophilic property we achieve self-cleaning property of titanium dioxide which possesses anti-bacterial property by absorbing ultra-violet with the help of its inherent photocatalytic properties. Ions and metal compounds may help certain degree of sterilization in this substance which is due to conversion of oxygen of the air into its active radical. By using nanoparticles of titanium dioxide there would be higher number of particles per unit area and therefore the anti-bacterial property reaches its maximum level.

DETAILED DESCRIPTION OF THE INVENTION

The biopolymer of our choice was corn starch as it is cheap and easily accessible and has suitable thermoplastic properties. Starch was kept in an oven of 75° C. for 24 hr.

Glycerol and starch were mixed in the ratio of 1/3. To select a synthetic polymer, we chose low density polyethylene among wide range of polymers such as polyethylene oxide, low and high density polyethylene and polypropylene. To produce a composite with good mechanical properties equal or higher than 5%; preferably 5%; polypropylene was added, as the properties of the latter are improved by addition of nanoclay particles.

The amount of starch as a biopolymer was taken from 30% to 50%. The amount of nanoclay particles was taken as equal or higher than 3% by weight; preferably 3%; in all samples and the amount of titanium dioxide nanoparticles was kept constant at 2% by weight in all the samples.

All the above formulations included maleic anhydride added in the extruder at equal or higher than 5%; preferably 5%; by weight, in melting temperature zones of 140/145/155/170/160/165° C. for reactions to take place to produce nanocomposites.

In this invention starch as biopolymer, polyethylene with the aid of polyethylene-maleic anhydride in the presence of nanoclay, titanium dioxide and polypropylene (5%) produced nanocomposites with biodegradable and anti-microbial properties.

The resulting nanocomposites have properties such as gas impermeability, biodegradability, anti-microbial and good mechanical properties.

Mechanical properties were, and biodegradability was tested by two methods of pure culture and soil burial. The studies on anti-microbial properties of the samples were carried out and confirmed by SEM and TEM.

TEM pictures show efficient dispersion of nanoclay particles and the intercalated silicates. In FIG. 1 of TEM pictures on nanocomposites having, all by weight, 50% starch and 3% nanoclay and 2% titanium dioxide nanoparticles are displayed with various magnifications.

Figure 2:
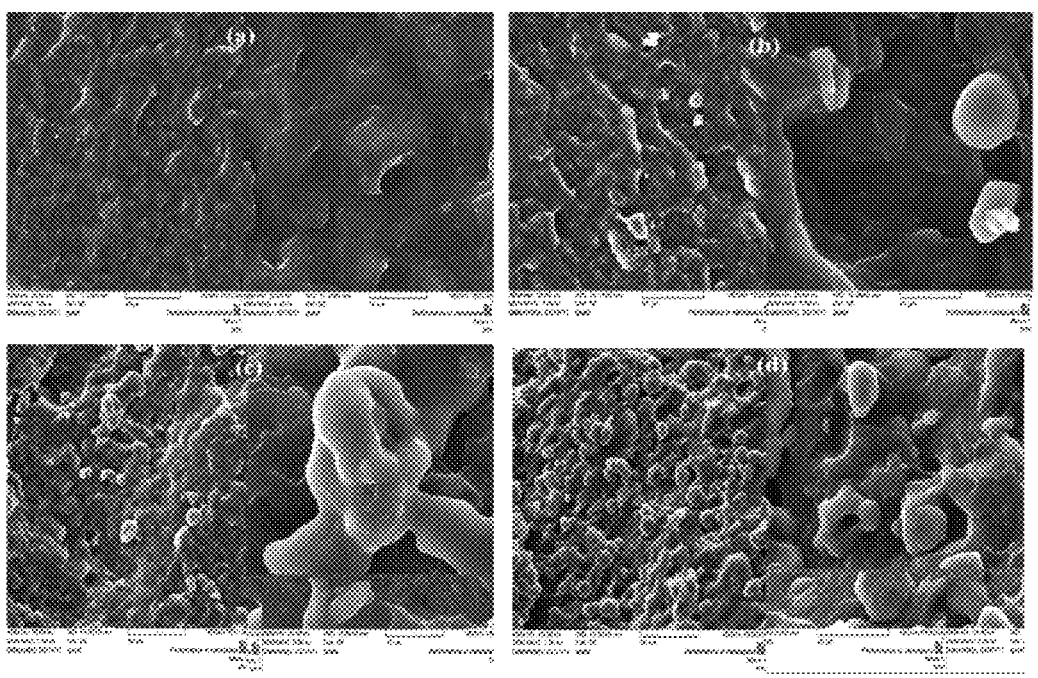
FIG. 2, displays SEM photos of the blends before fungi culture test.

Standard Methods to Examine Biodegradability of the Samples in Fungi Culture Medium:

The most useful method to confirm the biodegradability of a sample is to use SEM. SEM micrographs on PP/PELD/TPS in presence of variable amounts of starch prior to biodegradation tests are shown in FIG. 2. Microscopy pictures show the suitable mixing and distribution of starch granules in the polyethylene matrix.

Figure 3:
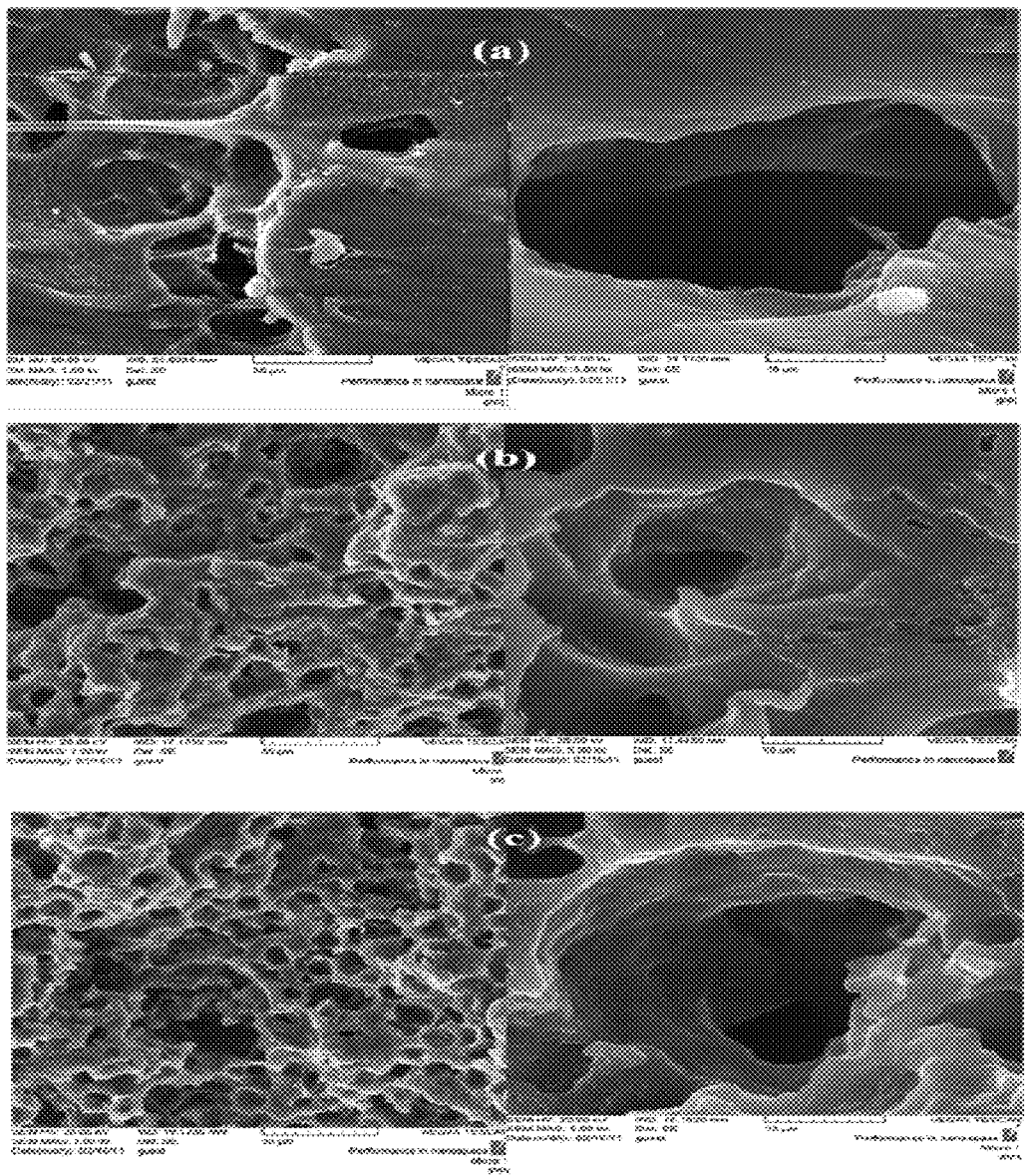
FIG. 3, displays SEM photos of the blends after 3 weeks exposure to fungi culture test.

SEM micrographs of the blends after biodegradation tests are shown in FIG. 3.

By comparing the blends' morphology prior and after ASTM G21 test it was noticed that all polymer samples had been attacked by microorganisms and the effect of degradation on samples of high starch content is at highest degree. Microscopy study demonstrates fungi diffusion inside the polymeric network and consumption of starch inside the network, i.e. the fungi have secreted the enzymes necessary for the starch to be assimilated and creating a porous polymer network. Therefore, increases in contact surface area between the fungi and polymer samples can influence polypropylene degradation.

Figure 4:
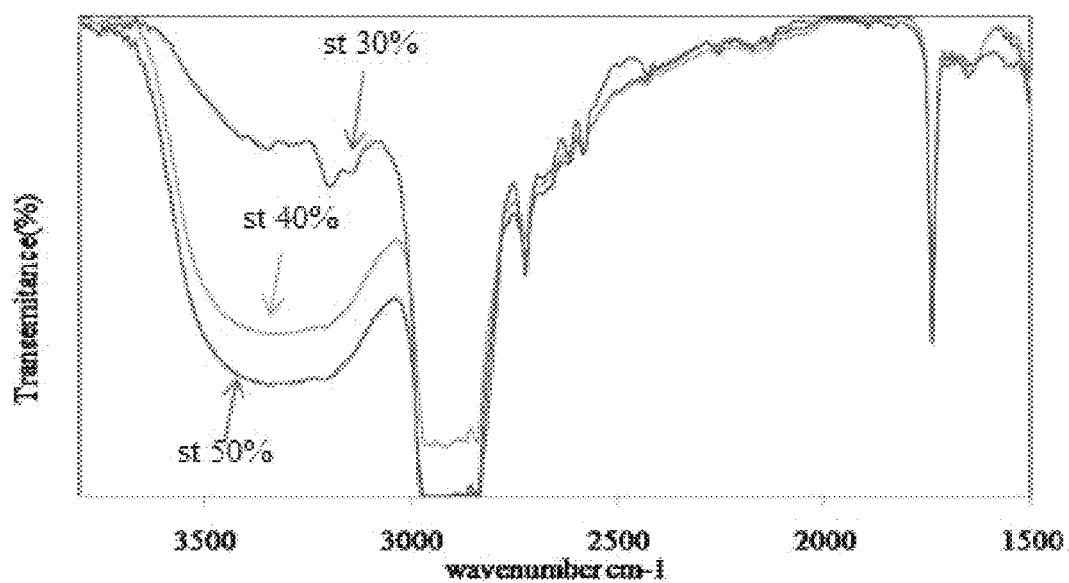
FIG. 4, displays FTIR spectra of the blends before fungi culture test.

Another method to confirm biodegradation of the samples is to follow the structural changes which can be examined by FTIR. The FTIR spectrograms of the blends of 50/50, 70/30, 60/40 of PP/PELD/TPS are shown in FIG. 4 before fungi culture test. As it is shown in this figure, by increasing the amount of starch of the blend the intensity of the peak related to hydroxide groups is increased within 3100-3600 $cm^{-1}$.

Increases in OH groups of the blends would result in greater absorption in intensity of the hydroxide groups and therefore there will be lower transmission and also with reduction in hydroxide groups in the blends with low percentage of starch there will be weaker intensity in hydroxide group absorption and higher percentage of transmission. The FTIR peaks data with functional group vibration, wavenumber and vibration mode are presented in Table 1.

After fungi inoculation on the samples microorganisms begin to secret degradative enzymes. Microorganisms with direct enzyme activity cause oxidative cleavage.

Natural polymers in biological systems are degraded by hydrolysis followed by oxidation. For biological degradation the presence of microorganisms such as fungi, microbes, actinomycetes, presence of oxygen, dampness, food source, temperature between 20-60° C., depending on the type of microorganisms and pH between 5 and 8, are indispensable. The samples were examined by FTIR spectroscopy for structural changes after ASTM G21.

Figure 5:
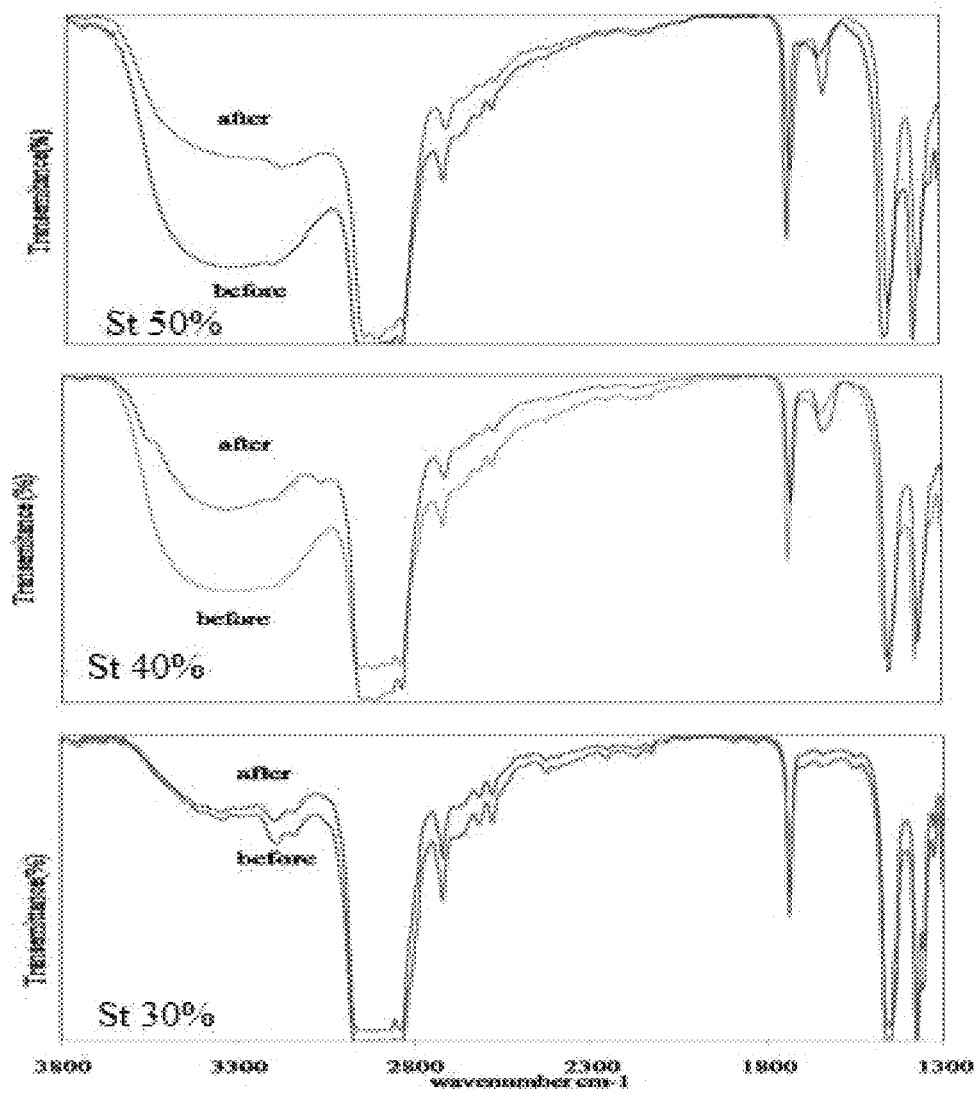
FIG. 5, displays comparing FTIR spectra of the blends before and after fungi culture test.

In FTIR FIGS. 4 and 5 of each blend, the samples were compared together for structural changes before and after biodegradation test. The absorption peaks due to hydroxide groups within 3100-3600 $cm^{-1}$ and carbonyl groups at least 1680 $cm^{-1}$ were considered as characteristic peaks to estimate the degree of biodegradability of the samples.

TABLE 1

FTIR peaks data of vibrational mode, functional group and wavenumber.

| ($cm^{-1}$) Wave number | Functional group | Vibrational mode |
|---|---|---|
| 2919 | —$CH_2$ | Non-symmetrical stretching |
| 2966 | —$CH_3$ | Non-symmetrical bending |
| 1457 | —$CH_3$ | Symmetrical bending |
| 1375 | —$CH_3$ | Symmetrical bending |
| 1730 | C=O | Tensional |
| 3100-3600 | —OH | Tensional |

Biodegradation Evaluation by Use of Sludge

To carry out this Test, 5 identical specimens were cut from each sample with 1 cm×3 cm dimension and weighed with a sensitive scale of 0.0001 accuracy. These specimens were dipped in an active sludge chamber. After certain period of time, one specimen was removed from each sample and placed inside an oven of 70° C. after washing with distilled water for 2 hr. The samples were weighed after drying to constant weight. The obtained results are given in Table 2.

TABLE 2

Weight measurement of samples at all specific durations of biodegradability test in active sludge.

| Samples | Weight of samples in grams | | | | | | | | | |
|---|---|---|---|---|---|---|---|---|---|---|
| | First 2 weeks | | First month | | Second month | | Third month | | Fourth month | |
| Starch 30% + 5% nanoparticles | 0/2501 | 0/2406 | 0/2365 | 0/2179 | 0/2290 | 0/1943 | 0/2665 | 0/2025 | 0/2211 | 0/1583 |
| Starch 40% + 5% nanoparticles | 0/1724 | 0/1677 | 0/1662 | 0/1498 | 0/1683 | 0/1329 | 0/1628 | 0/1091 | 0/1671 | 0/1037 |
| Starch 50% + 5% nanoparticles | 0/1483 | 0/1454 | 0/1613 | 0/1519 | 0/1906 | 0/1648 | 0/1852 | 0/1565 | 0/1723 | 0/1366 |

The presence of nanoparticles increased the polarity of the matrix and increased water absorption which in turn increased degradative hydrolyzation of starch domains.

The Anti-microbial Activity of Titanium Oxide Nanocomposite in in Vitro Environment Most studies carried out in the past emphasized on photocatalytic antimicrobial activity of titanium oxide films on *E. Coli* bacteria. In this invention Pseudomonal spp bacteria and *Rhodotorula mucilaginosa* fermentation were evaluated.

The selection of these microorganisms was based on general experience which showed these microorganisms are more commonly extracted from fruit and vegetables. The living cells were used in microbial treatment of nanocomposite films and pure polyethylene and tested by colony counting method before and after 3 hr of irradiation which are depicted in FIG. 6.

Figure 6:
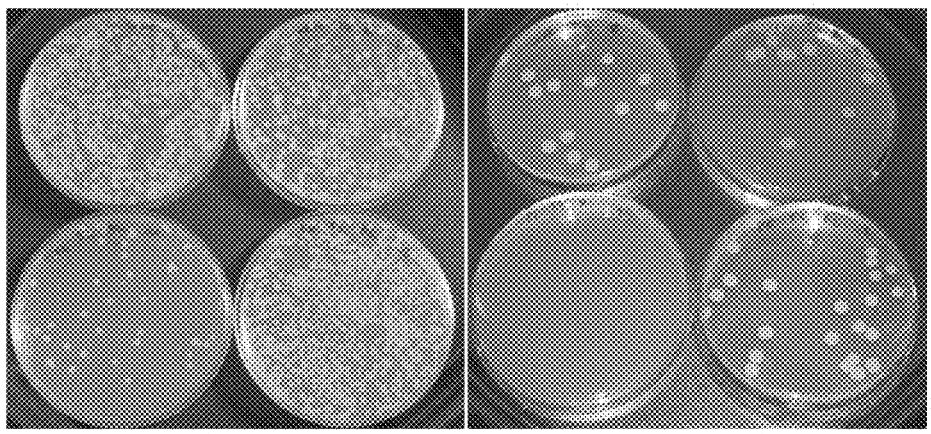
FIG. 6, displays colonies of microorganisms population on control and nanocomposite films before and after UVA irradiation. Clockwise from the top left: Film T with no irradiation, microorganism culture plate without irradiated film, an irradiated composite and irradiated film T.

By considering FIG. 6 the number of living bacterial cells in the sample did not show significant reduction without irradiation. This finding shows that nanocomposite film has not been able to deactivate microorganisms without irradiation. After exposure of nanocomposite films under UVA irradiation, the photocatalytic properties of these films were observed to deactivate microorganisms.

From the results it can be concluded that irradiation times on deactivation of microorganisms are widely apart. In actual fact, after UVA absorption by nanocomposite film at 250 nm wavelength, hydroxide radicals and $O_2$ reactive species, produced on the surface of films, play basic role in elimination of microorganisms. Table 3 presents the data obtained.

TABLE 3

Survival ratio (%) of *Pseudomonas* spp and *Rhodotorula mucilaginosa* in in vitro tests of UVA irradiated samples.

| | Survival rate (%) after 1 hr | | Survival rate (%) after 2 hr | | Survival rate (%) after 3 hr | |
|---|---|---|---|---|---|---|
| Sample | $P.$ spp[†] | $R.$ m[††] | $P.$ spp. | $R.$ m | $P.$ spp. | $R.$ m |
| LDPE NO UV | 99.08[a*] | 97.86[a] | 94.1[a] | 93.36[a] | 96.83[a] | 90.56[a] |
| LDPE | 96.1[ab] | 94.1[a] | 89.69[a] | 92.49[a] | 82.2[b] | 88.82[a] |
| Control | 94.45[b] | 91.44[a] | 91.01[a] | 91.26[a] | 85.59[b] | 88.64[a] |
| nanoparticles | 88.5[c] | 83.40[b] | 77.52[b] | 76.05[b] | 46.83[c] | 65.04[b] |

Figure 7:
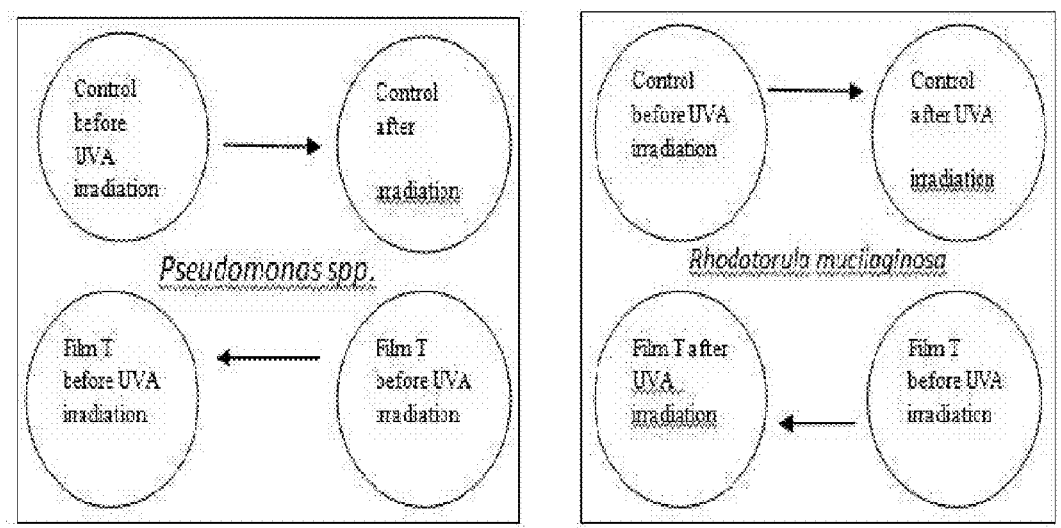
FIG. 7, displays colonies of microorganisms population on control and nanocomposite films before and after UVA irradiation.
Figure 8:
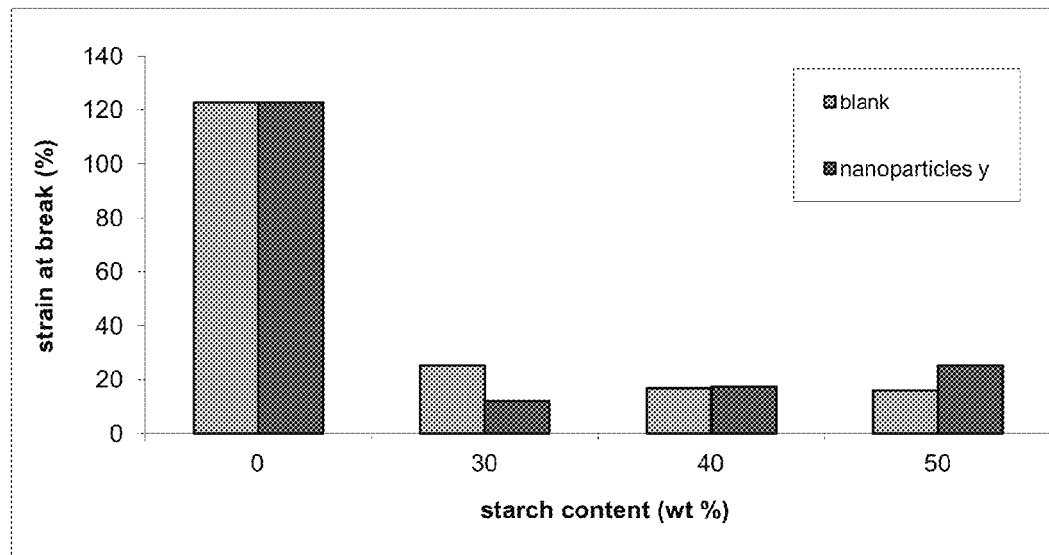
FIG. 8, displays Mechanical properties: impact test at the breakage point.

Mechanical Properties:

Impact resistance at failure point is shown in FIG. 7. It is possible to observe the differences between the samples without nanoclay particles and titanium and samples containing these two substances; that by addition of starch there is an increase in degree of impact resistance.

The tensile has been evaluated, which by increase in starch content in the sample containing nanoclay particles and titanium dioxide nanoparticles there is an increase in its value, which is a favorable condition in presence of higher amount of biodegradable substance such as starch.

Figure 9:
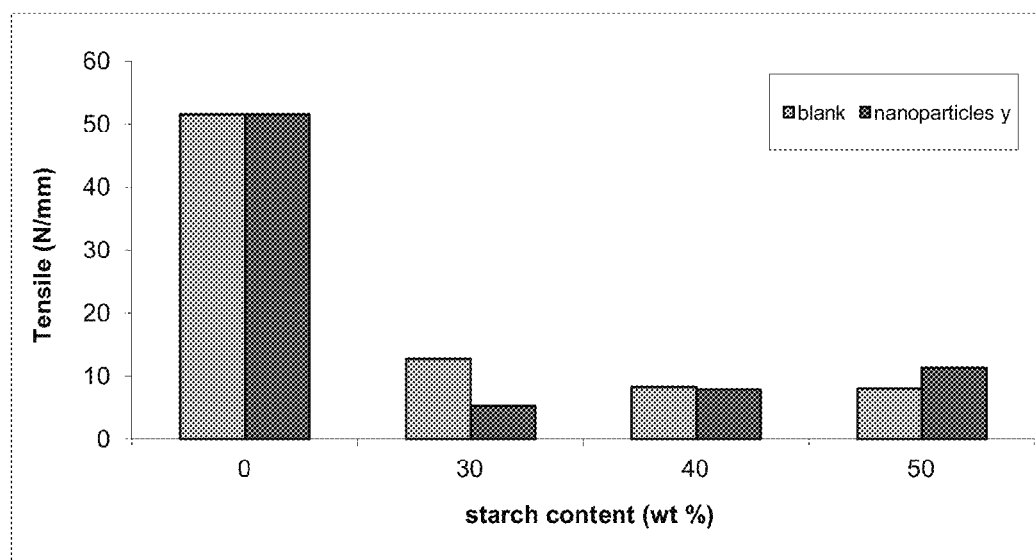
FIG. 9, displays Mechanical properties: tensile test.

In FIG. 9, the modulus has been evaluated that with increase in starch content in the sample containing nanoclay particles and titanium dioxide nanoparticles the modulus is decreased and in fact in the presence of these two substances the flexibility of the product is increased.

Biopolymers usually have weak mechanical properties and in this invention we have been able to improve not only the mechanical properties but impermeability against gases and antimicrobial properties by taking advantage of PELD and PP in presence nanoparticles of titanium dioxide and nanoclay particles. At the same time we have obtained products with more favorable physical properties by using at least 50% starch rather than 30% starch.

The presence of nanoclay creates much improvement and polypropylene in presence of clay shows very good mechanical properties.

Meanwhile, the presence of titanium dioxide nanoparticles would impart antimicrobial properties and it would make it useful for food and pharmaceutical packaging without any need for preservatives. The one-step production would make the whole production cost effective.

TABLE 4

Mechanical properties on produced samples.

| | samples | | |
|---|---|---|---|
| Mechanical Properties | Starch/LDPE 30/70 | Starch/LDPE 40/60 | Starch/LDPE 50/50 |
| Strain at break (%) | 25.2 | 16.17 | 15.84 |
| Tensile (N/mm) | 5.255 | 7.846 | 11.33 |
| Young modulus (MPa) | 252.6 | 289.2 | 317.3 |

EXAMPLES

Formulation 1

Starch was kept in an oven of 75° C. for 24 hr.

Figure 10:
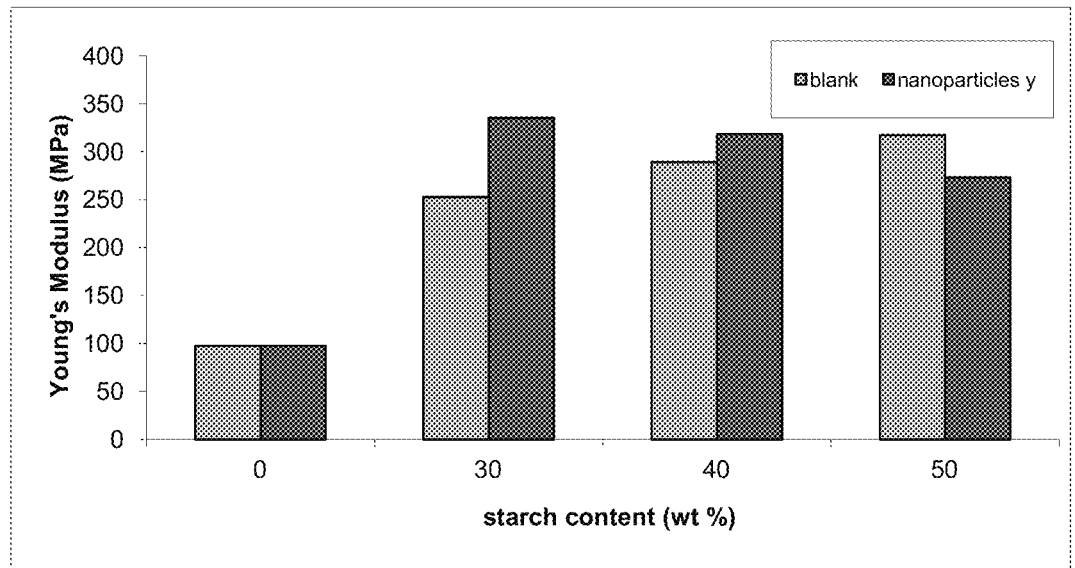
FIG. 10, displays Mechanical properties: modulus test.
Figure 11:
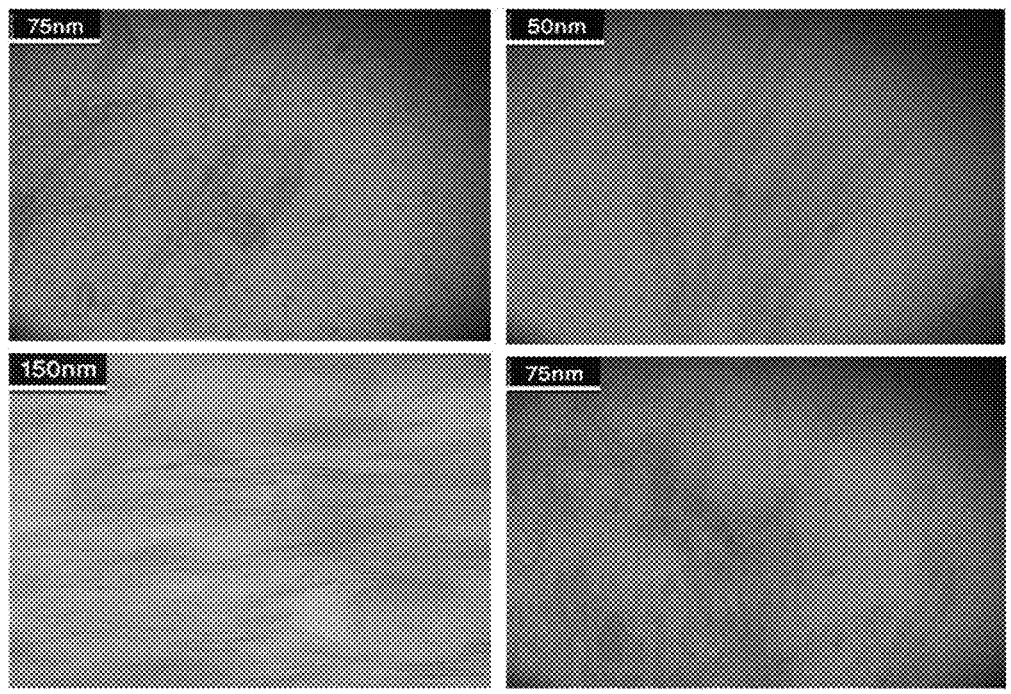
FIG. 11, displays TEM pictures of polymer matrix with best intercalation taken place in presence of 3% nanoclay.

Glycerol which was previously mixed with 3% nanoclay particles was added to starch by ⅓ of its content. This improved the intercalation of nanoparticles more effectively and helped to intercalate clay layers during extrusion process to be mixed well in the polymeric matrix. The results of nanoclay particles intercalation in polymer matrix were studied by TEM which are shown in FIG. 10.

Formulation 2

Preparation of Control Samples:

30% by weight starch which had been mixed with glycerol, 5% maleic anhydride, 5% polypropylene, and finally 60% by weight of light polyethylene.

40% by weight starch which had been mixed with glycerol, 5% maleic anhydride, 5% polypropylene, and finally 50% by weight of light polyethylene.

50% by weight starch which had been mixed with glycerol, 5% maleic anhydride, 5% polypropylene, and finally 40% by weight of light polyethylene.

Preparation of the Main Samples

30% by weight starch which had been mixed with 3% nanoclay particles and glycerol, 5% maleic anhydride, 5% polypropylene, and 2% by weight of titanium dioxide nanoparticles and 55% by weight of light polyethylene.

40% by weight starch which had been mixed with 3% nanoclay particles and glycerol, 5% maleic anhydride, 5% polypropylene, and 2% by weight of titanium dioxide nanoparticles and 45% by weight of light polyethylene.

50% by weight starch which had been mixed with 3% nanoclay particles and glycerol, 5% maleic anhydride, 5% polypropylene, and 2% by weight of titanium dioxide nanoparticles and 35% by weight of light polyethylene.

All original prepared samples were transferred to Brabender reactive extrusion and under temperature gradient condition of 140/145/155/170/160/155° C. and 100 rpm materials were melted for chemical reactions to take place.

For biodegradability and antimicrobial tests and mechanical properties determinations the test samples in form of sheets and dumb-bell were prepared by injection by using injection machine.

The results show that mechanical properties of the samples under the condition of increased starch content have not dropped and tensile has increased e.g., from 5.25% of 30% starch content to 11.33% by 50% content.

Biodegradable test of the samples are depicted in FIGS. 2, 3, 4, and 5 and Tables 1 and 2.

Structural evaluation and production of samples quality are studied by TEM and SEM.

By addition of starch into polymeric matrix for imparting biodegradability the samples' mechanical properties are reduced.

With the aid of glycerol the flexibility of samples are increased which by reaction of starch with glycerol the samples are prevented from breakage.

The presence of maleic anhydride, as a compatibilizer, is very important for bond formation between polyethylene and polypropylene with starch.

Clay nanoparticles not only improved the mechanical properties of the samples but at reaction stage inside the extruder improved polypropylene properties. Nanoclay particles have shown impermeability property towards steam, gases and damp which are of great concern in packaging industry.

Titanium dioxide nanoparticles with their antimicrobial property have potential application in food and pharmaceutical packaging while eliminating the need for food and pharmaceutical preservatives.

It is understood that the above description and drawings are illustrative of the present invention and that changes may be made in materials, method steps without departing from the scope of the present invention as defined in the following claims.

The invention claimed is:

1. A method for preparing a biodegradable nanocomposite comprising the steps of:
   a) mixing at least 3% by weight of nanoclay particles with a plasticizer of choice forming mixture 1;
   b) mixing mixture 1 with a biopolymer, wherein the ratio of said biopolymer with said plasticizer of choice is ⅓ forming mixture 2, wherein step a) must be performed before step b); creating a more effective intercalation;
   c) providing a batch of synthetic materials comprising compatibilizers, polyethylene, polypropylene and anti-microbial nanoparticles forming mixture 3;
   d) simultaneously transferring mixture 2 and mixture 3 into an extruder and combining by reactive extrusion creating a final product; wherein said anti-microbial nanoparticles comprise at least 30% of anatase titanium dioxide nanoparticles and 70% of rutile titanium dioxide nanoparticles.

2. The method of claim 1; wherein said plasticizer of choice comprises glycerol.

3. The method of claim 2, wherein said biopolymer comprises polysaccharides; carboxymethyl cellulose, chitosan, keratin and/or starch; wherein said starch comprises various types extracted from peas, soya, potatoes, corn and/or wheat.

4. The method of claim 3, wherein said glycerol was added into said starch of 30%.

5. The method of claim 4, wherein 2% by weight of said titanium dioxide nanoparticles are used.

6. The method of claim 5; wherein said compatibilizer comprises maleic anhydride; wherein said compatibilizer mixes well with said nanoclay particles and said polypropylene.

7. The method of claim 6, wherein said compatibilizer creates a polar group onto a hydrophobic chain which is facilitated by said extrusion methods.

8. The method of claim 7; wherein said titanium dioxide increases suitability of said final product for food and pharmaceutical packaging.

9. The method of claim 8; wherein said maleic anhydride and said polypropylene of each 5% by weight was added to said mixture.

10. The method of claim 9, wherein said nanoclay particles modify properties of said polypropylene by improving impact and tensile strength of said final product.

11. The method of claim 10, wherein said titanium dioxide nanoparticles of 2% by weight were added; and wherein sheets and dumbbells were obtained from granules of said final product by using an injection machine for practical evaluation of mechanical properties and biodegradability of said final product.

12. The method of claim 11; wherein nanoparticles of said titanium dioxide impart antimicrobial characteristics to said final product and would increase service life of food and pharmaceutical substances packaged by using such formulations while there is no need for preservatives.

13. The method of claim 12; wherein nanoclay articles improve said mechanical properties and would prevent passage of gases and steam; and in turn would increase said service life of said substances packaged.

14. The method of claim 13; wherein said biopolymer would impart biodegradability to said final product and would not reduce said mechanical properties by increasing said biodegradability of said final product.

15. The method of claim 14; wherein said biodegradable nanocomposites are applicable in agriculture, said food, said pharmaceutical packaging, plastic bags, disposable dishes and/or plates.

16. The method of claim 15; wherein said starch was kept in an oven of 75° C. prior to use.

17. The method of claim 16; wherein said maleic anhydride was added in said *extruder at equal or higher than 5%; by weight, in melting temperature zones 140/145/155/170/160/195° C.

* * * * *